United States Patent [19]
Ward

[11] Patent Number: 5,497,693
[45] Date of Patent: Mar. 12, 1996

[54] REPLACEMENT CYLINDER FOR CAST IRON BLOCK ENGINE REMANUFACTURE

[75] Inventor: Michael S. Ward, Liberty, Mo.

[73] Assignee: Patent Master, Inc., North Kansas City, Mo.

[21] Appl. No.: 251,351

[22] Filed: May 31, 1994

[51] Int. Cl.$^6$ ................................................. F16J 10/04
[52] U.S. Cl. ................................ 92/169.1; 92/171.1
[58] Field of Search .................................. 92/169.1, 171.1

[56] References Cited

U.S. PATENT DOCUMENTS

| | | | |
|---|---|---|---|
| 2,434,880 | 1/1948 | Bramberry | 29/888.06 |
| 2,783,749 | 3/1957 | Effmann | 92/171.1 |

OTHER PUBLICATIONS

"Cylinder Liner Design" Automobile Engineer, vol. 43 No. 571 (Oct. 1953) pp. 427–439.

*Primary Examiner*—F. Daniel Lopez
*Attorney, Agent, or Firm*—Litman, McMahon and Brown

[57] ABSTRACT

A replacement cylinder for the remanufacture of cast iron engine blocks includes a sleeve formed of cast iron and having a relatively thin wall, a selected length, an outer diameter to achieve a slight clearance of fit within an overbored cylinder, an inner diameter equal to the original specifications of the original manufacturer of the engine block, and a helical cross hatched inner surface finish. The replacement cylinders are manufactured by placing an unfinished sleeve in a boring fixture, boring the inner surface to a selected diameter, transferring the bored sleeve to a honing fixture, and honing the inner surface to the required diameter and surface finish. An adhesive is applied to the prefinished replacement cylinders and the overbored block cylinders, and the replacement cylinders are inserted into the overbored cylinders wherein the adhesive is allowed to cure to thereby adhesively retain the replacement cylinders within the block.

12 Claims, 3 Drawing Sheets

REPLACEMENT CYLINDER FOR CAST IRON BLOCK ENGINE REMANUFACTURE

BACKGROUND OF THE INVENTION

The present invention relates to the restoration of engines and, more particularly, to the remanufacture of cast iron block engines using prefinished cylinder liners.

Within a reciprocating engine, the space between each piston and its cylinder wall is sealed by several piston rings. Each ring is resiliently urged in an outward radial direction so that sealing contact with the cylinder wall is maintained. Thus, during operation of such engines, sliding frictional contact between piston rings and cylinder walls wears the ring contact surfaces and cylinder walls. As wear progresses, compression is more difficult to maintain and, additionally, there is increased oil consumption and increased oil contamination from combustion products forced past the piston rings.

In general, replacement parts and restoration methods are available for large engines and engines which are required to be highly reliable, such as aircraft engines. Many diesel engines are designed and built with replaceable cylinders, and replacement cylinder and piston sets are manufactured and made available for overhauling diesel engines. The same is often true of aircraft engines, particularly large engines. Smaller aircraft engines are usually restored using remanufactured cylinders wherein the inner cylinder surface is plated to build up wall thickness and then machined to the desired dimensions and tolerances. One aspect of each of these types of restoration operations is that each is very expensive and can only be justified economically in commercial operations or in situations in which the cost of replacement of the entire engine is prohibitive.

In order to increase fuel economy by reducing overall vehicle weight, several automobile manufacturers have designed and produced engines wherein the cylinder block and heads, crankcase, and oil pan are formed of aluminum alloys. While such aluminum alloys perform adequately in a structural sense, they are too soft to stand up to high speed frictional loads and would wear quickly in such applications. To avoid this, other metals or materials are employed for components subject to friction, such as bearings. In particular, cast iron cylinder liners are employed for frictional sealing engagement with the piston rings. Such cylinder liners for aluminum block engines are referred to as "wet cylinder" liners because the engine coolant directly contacts the outer surfaces of such liners to carry away heat from engine combustion and piston friction.

Occasionally, during the operation of a piston engine, the piston rod can become separated from either the piston or the crankshaft. This is referred to as "throwing a rod" and can be very damaging to cylinder walls and to other components within the engine. The usual result is a gouging of the cylinder wall. If the gouge is not too deep, the cylinder can often be repaired by boring out the affected cylinder and the insertion of a replacement cylinder which is then bored and honed to the required dimensions within the block. Because it is necessary for all the cylinders of an engine to have the same volumetric displacement for engine balance purposes and since it is not economical to bore out and reline the remaining cylinders, the usual procedure is to redimension all the cylinders, including the repaired cylinder, to a greater radius than the original dimensions and to install oversized pistons. In older engines which were not computer controlled and wherein emission standards were not so strict, such repair methods were usually adequate. However, such relining of cylinders of modern engines which changes the displacement of the engine causes operational problems since the control computer and pollution controls are set up for controlling the operation of an engine with a given displacement.

Because conventional automobile engines with cast iron blocks are manufactured in mass quantities, it is currently not economical to restore the worn cylinders of an engine block to their original specifications. If an engine replacement is needed for an otherwise serviceable vehicle, it is currently more economical to install a new engine or an engine salvaged from a wrecked vehicle. Cast iron engine blocks with worn cylinders are usually discarded or recycled as scrap metal. This is a waste of the energy and resources which were expended in manufacturing the engine block.

In engines for which cylinder replacement is designed from the outset, the cylinder structures are relatively thick walled. This facilitates machining and honing of the inner cylinder surface since the cylinder structures are self-supporting and stiff enough that there is virtually no distortion of the cylinder wall during machining operations. This allows quick and accurate dimensioning and finishing of the inner cylinder surface. Such engines and replacement cylinders are also designed for relatively convenient replacement of worn cylinders without machining of the cylinder block. In the case of diesel engines, an upper lip of the cylinder engages a shoulder groove in the block while the lower end engages a similar shoulder. The cylinder is then held in place by the cylinder head. Adhesives are often used to seal between the upper rim of the cylinder and the block to prevent the entry of carbon therebetween would act as an insulator and interfere with heat transfer.

Conventional automobile engines with cast iron blocks are not designed for cylinder replacement. The cylinder structure is cast as an integral part of the cylinder block and machined to the required cylinder dimensions. When cylinder repair is required, relatively thin walled cylinder liners are used. In such a case, machining of the cylinder liner occurs with the liner located within the block. The liner wall is, thus, supported by the portion of the original cylinder wall which remains. Because of the relative thinness of the walls of such liners and the difficulty of accurately machining and finishing the inner surface thereof, it has heretofore been considered impractical to supply such liners in a prefinished condition, which would otherwise economize the restoration of such engine blocks to their original displacement specifications.

SUMMARY OF THE INVENTION

The present invention provides methods and apparatus for restoring the cylinder blocks of conventional automobile engines to their original manufacturer's displacement specifications by the use of prefinished thin walled cylinder structures and improved methods of installation of such prefinished cylinder structures.

The restoration cylinders are formed of cast iron tubular stock having a wall thickness on the order of a tenth of an inch (100 mils) prior to prefinishing. The cylinders may be provided in a range of diameters, wall thicknesses, and lengths to accommodate the restoration of a wide variety of sizes of engine blocks. For a given engine block, the outer diameter of the sleeve is greater than the specified cylinder diameter of the engine block while the inner diameter is less than the specified cylinder diameter to allow for boring and honing of the inner surface of the sleeve to the required dimension and surface finish. As manufactured, the restoration sleeves have the same inner diameter as originally specified for the new engine block and have a helical crosshatch surface pattern which facilitates the seating of piston rings within the restored cylinders.

In a preferred embodiment of the present invention, the restoration sleeves are positioned in jigs or fixtures for boring and honing operations. A boring fixture for the sleeves is formed by base plate and a vertically spaced upper plate. The base and upper plates have aligned apertures with diameters slightly greater than the diameter to which the sleeves will be bored. Each of the base apertures in the base plate has an upper shoulder or edge groove which positively locates the lower ends of the sleeves with respect to the base apertures. Similarly, the upper apertures have lower shoulders or edge grooves to receive and positively locate the upper ends of the sleeves. The base and upper plates have a plurality of apertures so that a number of sleeves can be bored in a batch operation. A plurality of unfinished sleeves are positioned in alignment with the base apertures and support the top plate which is positioned thereon. Regularly spaced over-center clamps are engaged between the base plate and the upper plate to clamp and fix the positions of the sleeves within the boring fixture. The sleeves are bored by a rotary boring machine, either simultaneously or one at a time depending on the nature of the boring machine, to bring the inner diameter of the sleeves to within a selected tolerance of the desired diameter.

A honing fixture is similar in some respects to the boring fixture and is formed by a base plate and an upper plate with aligned apertures. The apertures of the plates have facing edge grooves to positively position the sleeves in alignment with the apertures. The prebored sleeves are clamped between the base and upper plates by sets of circumferentially spaced bolts which are tightened to a torque which will adequately fix the positions of the sleeves but not so tight as to distort the shape of the sleeves.

The inner surfaces of the sleeves are honed by a rotary honing machine having a honing head formed by a plurality of honing sticks positioned as cylindrical elements of the honing head. Preferably, the honing machine is of the type wherein the centrifugal pressure of the honing sticks against the inner surface of the sleeves as well as the rotational speed and vertical dwell of the honing head can be precisely controlled by programming or by mechanical setup. Proper control of the centrifugal pressure of the honing sticks avoids radial distortion of the sleeve wall, resulting in precise inner sleeve diameter and radial uniformity. The vertical dwell of the honing head is controlled in such a manner as to apply a helical crosshatch surface finish to the inner surfaces of the sleeves which is needed to promote proper seating of piston rings during operational break-in of the remanufactured engine.

In order to support the sleeve wall, particularly during honing, the sleeve supporting fixtures may be used in cooperation with a sleeve supporting bladder. The bladder is annular in shape with a central opening within which a sleeve is positioned during the machining operation. The bladder is inflated with a gas or liquid to engage an inner wall of the bladder with the outer surface of the sleeve wall to resist the radial pressure of the machining operation to thereby avoid radial distortion of the sleeve wall during machining. This enhances the precision of the honing operation and results in greater radial uniformity of the inner surface of the sleeve.

As an alternative to the above described sleeve supporting fixtures, the present invention contemplates other methods and apparatus or fixtures for supporting the restoration sleeves during machining operations. In a clam shell or separating block fixture, a support block is formed in halves which are slidably supported on tracks or guides of a support plate for movement toward and away from one another by linear motors, such as hydraulic cylinders. A sleeve receiving cylinder recess, of a diameter to fit the sleeve stock to be machined, is bored in the support block halves, half the recess in each block half. A sleeve is positioned in the recess between the separated block halves, and the block halves are closed to snugly clamp the sleeve therebetween. The cylinder surface of the recess of the block prevents the pressure of the boring tool or the honing head from distorting the wall of the sleeve during machining operations. The clam shell type of fixture is best suited to high volume manufacturing operations where the cost of providing a set of block halves for each size of sleeve to be manufactured can be more readily justified. The support block may be sized and bored to simultaneously support a plurality of sleeves.

Engine block restoration sleeves manufactured and prefinished in a variety of sizes by the above described processes are stockpiled for later installation in engine block cylinders. When an engine block is to be remanufactured, the existing cylinders are overbored to a diameter which will achieve a selected degree of tightness with the installed cylinder sleeves. Sleeves of the proper size to restore the cylinder block to its original cylinder specifications are then inserted into the overbored cylinders.

A preferred sleeve insertion process in the present invention is to overbore the block cylinders to a diameter just slightly greater than the outer diameter of the replacement cylinders and to adhesively retain the replacement cylinders within the overbored cylinders. The block cylinders are overbored to a clearance of about one to two thousandths of an inch (0.025 to 0.05 millimeters) relative to the outer diameter of the replacement cylinders. An adhesive is then applied to the block cylinder surfaces and the outer surfaces of the replacement cylinders, and the replacement cylinders are inserted into the overbored block cylinders where the adhesive is allowed to cure. The adhesive used is preferably an anaerobically curing adhesive which is tolerant of the operating temperatures of the engine and which does not interfere with the transfer of heat from the replacement cylinders to the cylinder block. Certain kinds of acrylic adhesives of this type are known and used in various applications in the automotive industry.

The present invention provides processes for economically remanufacturing cast iron engine blocks of the sizes used in common automobiles. The most critical aspect of manufacturing the restoration sleeves, which is the honing and surface finishing process, is carried out on a large scale which is a more efficient use of the expensive honing machinery and specialized machinist skills. The slight clearance between the overbored block cylinder and the replacement cylinder has two main advantages. The degree of precision required of the block cylinder boring process is not as high as would be required for an interference fit of the replacement cylinder in the block cylinder. The slight clearance between the overbored cylinder and the replacement sleeve avoids transferring slight irregularities of the overbored cylinders to the sleeves. Additionally, the actual cylinder insertion process does not require that the replacement cylinder be forced into the block cylinder, which avoids the potential for distortion of the sleeve wall by such forced insertion. Thus, the efforts of an engine rebuilding shop in remanufacturing an engine block are substantially reduced by using the prefinished cylinders and method of adhesive installation of the present invention, without compromising the quality of the end product.

The present invention provides an alternative method of installing the prefinished cylinders in an engine block. The block cylinders are overbored for an interference fit of the replacement cylinders therein, and the replacement cylinders are cold shrunk prior to insertion. The overboring process must be accomplished with a high degree of precision and regularity, as compared to the boring process used in cylinder repair processes, since any irregularity of the cylinders will be transferred to the cylinder sleeve which is installed and since no further machining of the installed sleeve will occur. Cold shrinking contracts sleeves which can be inserted into with little or no resistance. As the temperature of the sleeves rises to equilibrium with the block, the sleeves expand to frictionally engage the overbored cylinders. It should be noted that the cold shrunk sleeves must be handled using refrigerated tools to avoid localized warming of portions of the sleeves which can cause distortions and possible stresses and consequent failure of the sleeves during operation of the engine.

Although the engine block overboring process requires a fair degree of precision and the cold shrinking of the sleeves prior to insertion in the engine blocks requires the provision of specialized refrigeration equipment, the overall process of remanufacturing an engine block at an engine rebuilder's facility is simplified and, thereby, economized.

OBJECTS AND ADVANTAGES OF THE INVENTION

The principal objects of the present invention are: to provide apparatus and methods for remanufacturing or restoring the cylinders of cast iron cylinder blocks of conventional automobile engines to the original cylinder specifications of the original engine manufacturer; to provide, particularly, prefinished restoration cylinders for cast iron engine blocks; to provide such restoration cylinders or cylinder sleeves which are formed of cast iron of a selected length, outer diameter, inner diameter, and inner surface finish; to provide such replacement cylinders which have an inner diameter equal to the original manufacturer's specified diameter for the particular engine and which have a helical crosshatch surface finish to aid in piston ring seating; to provide such restoration cylinders which can be inserted into the bored out cylinders of the engine block to be restored; to provide fixtures for supporting such restoration cylinders during boring and honing operations to manufacture the cylinders; to provide such fixtures including a base plate and an upper plate, the plates having aligned apertures which are grooved on facing sides to align the restoration cylinders with the apertures, and the base and upper plates being clamped into engagement with the cylinders to fix the positions thereof during machining; to provide apparatus to support the walls of the cylinders during machining to avoid distortion of the walls by radial force or pressure of the machine tools; to provide an annular bladder within which a restoration cylinder is received and which is inflated to engage an inner wall of the bladder with the outer surface of the sleeve wall to resist distortion of the sleeve wall during machining; to provide a clam shell or separating block fixture formed of block halves with halves of a sleeve receiving recess bored therein, the block halves slidably mounted on a support plate and moved toward and away from one another by linear motors to support the entire wall of a sleeve during machining; to provide a method of installation of such prefinished restoration cylinders into an engine block; to provide a preferred installation method including overboring the existing block cylinders to a diameter slightly greater than the outer diameter of the restoration cylinders and adhesively retaining the restoration cylinders in the overbored cylinders; to provide such a preferred installation method which uses an anaerobically curing, noninsulating adhesive; to provide such an alternative installation method including overboring the existing cylinders of the engine block to a diameter which will cause the restoration cylinders to be frictionally retained in the overbored cylinders; to provide such an alternative method wherein the prefinished restoration cylinders are cold shrunk prior to installation in the engine block whereby the restoration cylinders can be inserted into the overbored block cylinders with little resistance and then frictionally retained when the restoration cylinders expand upon the temperatures of the engine block and the restoration cylinders equilibrating; and to provide such apparatus and methods for remanufacturing cast iron engine blocks which are economical to manufacture and carry out, which are capable of a high degree of precision, and which are particularly well adapted for their intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
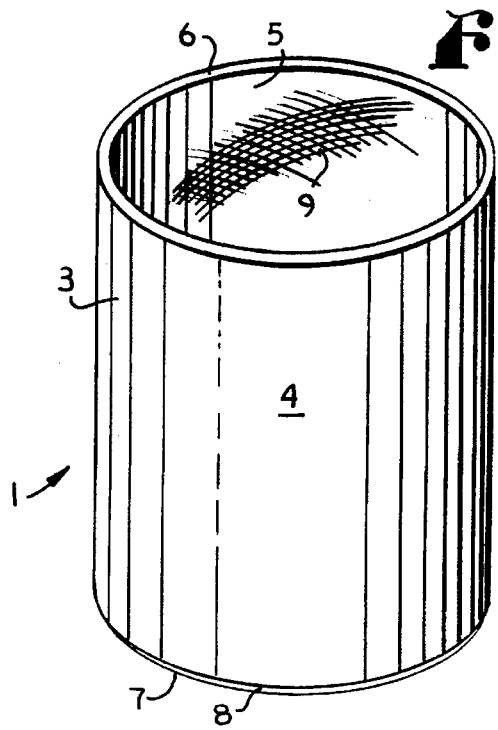
FIG. 1 is a perspective view of a replacement cylinder for the remanufacture of a cast iron engine block which embodies the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 7:
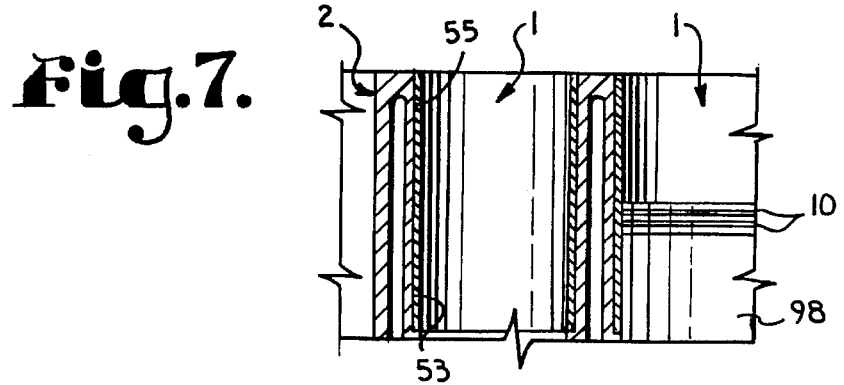
FIG. 7 is a fragmentary diagrammatic sectional view of a cylinder block of an engine and illustrates replacement cylinders according to the present invention installed in the cylinders thereof.

Referring to the drawings in more detail:

The reference numeral 1 generally designates a prefinished replacement cylinder for the remanufacture of a cast iron engine block 2 (FIG. 7). The replacement or restoration cylinder 1 generally includes a relatively thin cylindrical wall 3 having an outer cylindrical surface 4 and an inner cylindrical surface 5. The cylinder 1 has a top rim 6 and a bottom rim 7 which is provided with a chamfer or bevel 8 to facilitate insertion of the cylinder 1 into the block 2. The inner cylindrical surface 5 of the cylinder 1 is provided with a helical crosshatch surface finish, indicated at 9, which aids in seating of piston rings 10 when the remanufactured engine block 2 is being broken in.

The cylinder or sleeve 1 is formed of tubular cast iron stock which is similar to the metal from which the block 2 is cast to provide for similar thermal expansion and contraction characteristics. The stock from which the cylinder 1 is manufactured preferably has a minimum wall thickness which will allow convenient machining to minimize the amount of material which will need to be bored out of the block 2 to accommodate the cylinder 1. The initial wall thickness may, for example, be approximately one tenth of an inch (100 mils), which is on the order of about two millimeters. The cylinders 1 may be manufactured in a variety of lengths and diameters to provide for the remanufacture a wide variety of engine blocks 2. In general, the process for prefinishing the cylinders 1 includes the steps of supporting a plurality the cylinders 1, boring the inner cylindrical surface 5 to slightly less than the desired diameter, then honing the inner surface 5 to achieve the desired radius, radial uniformity, and surface finish.

Figure 3:
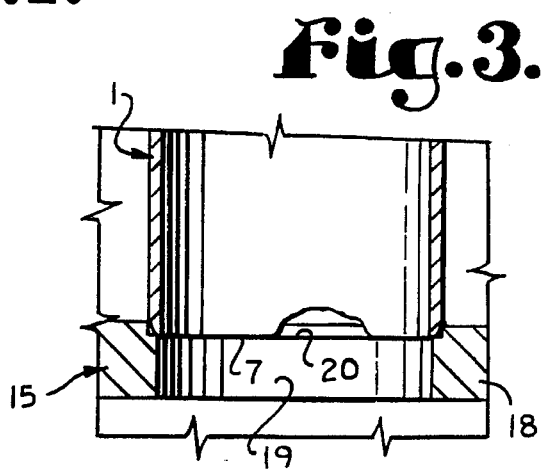
FIG. 3 is an enlarged sectional view taken on line 3—3 of FIG. 2 and illustrates further details of the boring fixture.
Figure 2:
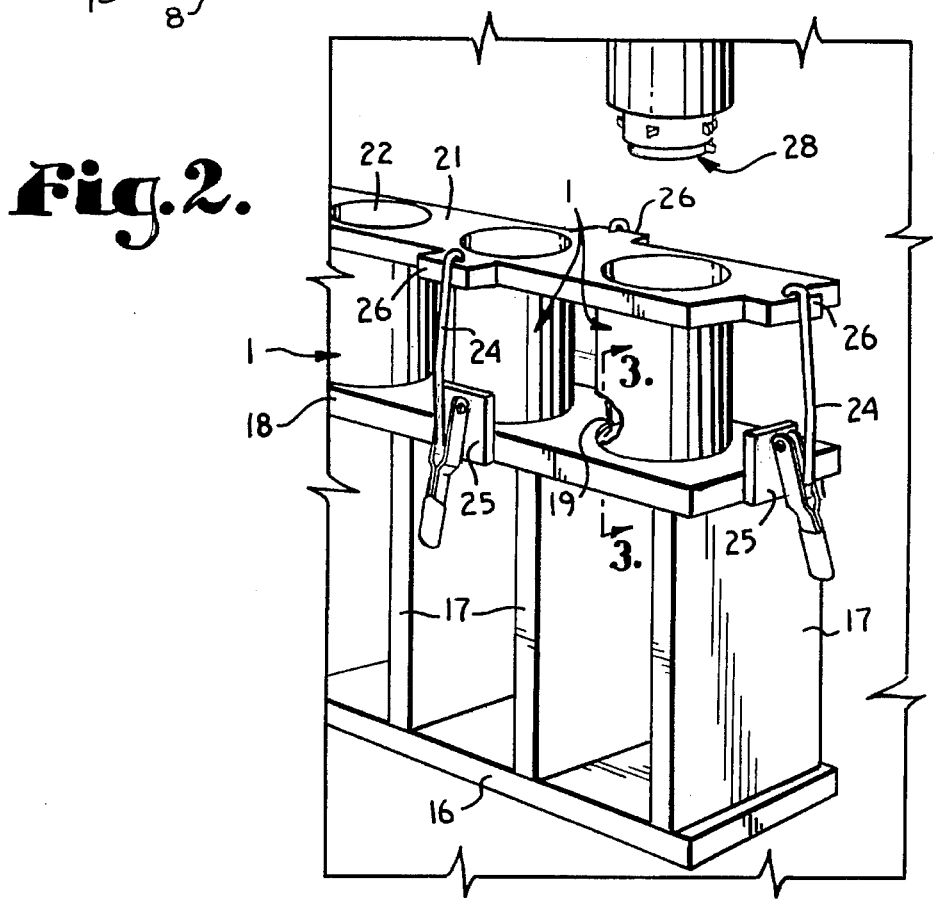
FIG. 2 is a fragmentary perspective view at a reduced scale of a boring fixture for coarse boring of the inner surface of the replacement cylinder.

FIGS. 2 and 3 illustrate a boring jig or fixture 15 in which the cylinders 1 are supported during the boring operation. The illustrated boring fixture 15 includes a floor plate 16 having a plurality of vertical plates 17 upstanding therefrom. A base plate 18 is supported by the vertical plates 17 and has a plurality of base apertures 19 formed therein. As shown in FIG. 3, each base aperture 19 has an edge groove or shoulder 20 formed about an upper edge of the aperture 19. The groove 20 provides for positive positioning of the lower end 7 of a cylinder 1 in relation to the aperture 19. A plurality of cylinders 1 are received in the grooves 20 of the apertures 19, and an upper plate 21, having a plurality of upper apertures 22, is positioned on the cylinders 1 with the apertures 22 in alignment with the cylinders 1 and base apertures 19. Each of the upper apertures 22 has a lower edge groove or shoulder 20, similar to the groove 20 of the base apertures 19, which is positioned on a lower side of the upper plate 21 to be engaged by the upper end 6 of the cylinder 1.

The cylinders 1 are clamped between the base plate 18 and the upper plate 21 of the boring fixture 15 by means of over-center clamp devices 24. Alternatively, other means of clamping the cylinders 1 between the base plate 18 and the upper plate 21 can be employed. The base plate 18 has a plurality of clamp mounting brackets 25 distributed thereabout, and the upper plate has a plurality of clamp receiving brackets 26 positioned to align with the brackets 25. The clamp devices 24 are configured to clamp the cylinders 1 tightly enough to fix the cylinders 1 in place without distorting the walls 3 thereof. The inner surfaces 5 of the cylinders 1 are bored by a rotary cutting head 28 which is movable vertically to bore the length of the cylinders 1. The boring head 28 may be a component of a machine tool such as the Berco/Peterson Bore Wizard.

Figure 4:
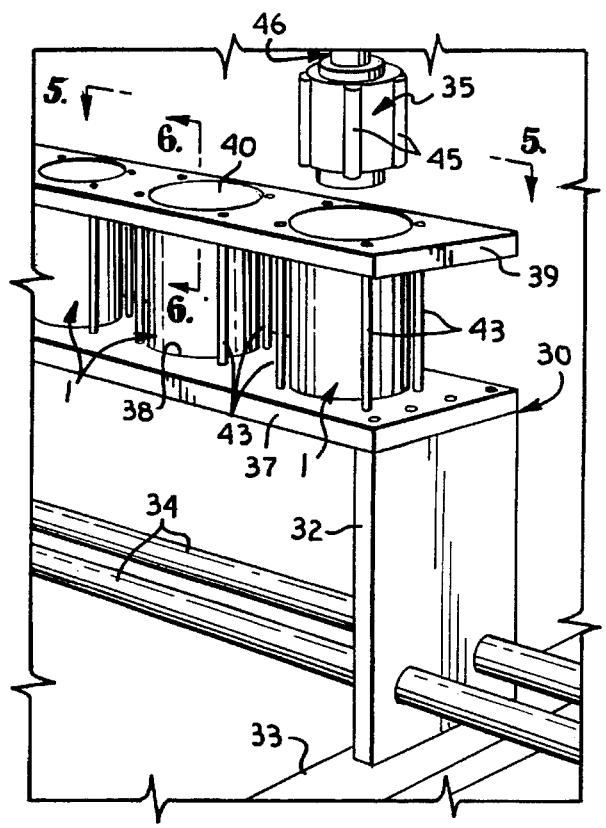
FIG. 4 is a fragmentary perspective view at a reduced scale of a honing fixture for honing of the inner surface of the replacement cylinder.
Figure 6:
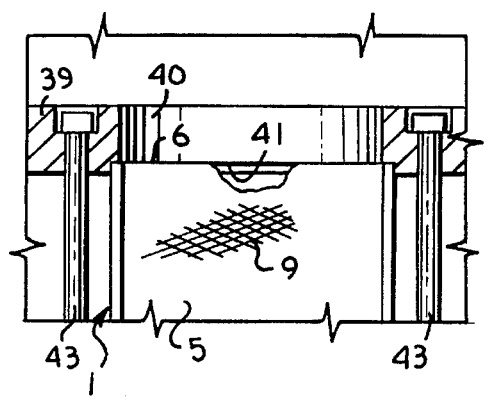
FIG. 6 is a further enlarged fragmentary sectional view taken on line 6—6 of FIG. 4 and illustrates further details of the honing fixture.
Figure 5:
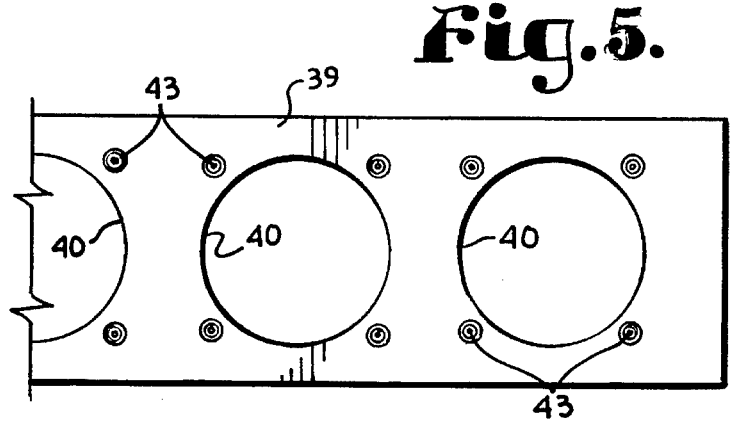
FIG. 5 is an enlarged fragmentary top plan view taken on line 5—5 of FIG. 4 and illustrates further details of a top plate of the honing fixture.

FIGS. 4–6 illustrate a honing jig or fixture 30 for supporting the cylinders 1 during honing operations. The illustrated honing fixture 30 includes a pair of legs 32 (one of which is shown) resting on respective feet 33. The legs 32 are engaged by a pair of guide rails 34 which provides for accurate placement of the fixture 30 with respect to a honing head 35. The legs 32 support a base plate 37 having a plurality of base apertures 38 formed therethrough. An upper plate 39 also has a plurality of upper apertures 40 formed therein which are alignable with the base apertures 38. The lower edges of the upper apertures 40 have edge grooves or shoulders 41, and the upper edges of the base apertures 38 have similar grooves 41. The grooves 41 positively align the cylinders 1 with the base apertures 38 and upper apertures 40 by engaging the upper edges 6 and lower edges 7 of the cylinders 1.

The cylinders 1 are clamped between the base plate 37 and upper plate 39 of the honing fixture 30 by means of sets of bolts 43 which are distributed regularly about the apertures 38 and 40. The bolts 43 are threaded into the base plate 37 and are tightened to a selected torque which is sufficient to fix the positions of the cylinders 1 within the honing fixture 30 but not tight enough to distort the walls 3 of the cylinders 1. The bolts 43 are preferably positioned as close to the clamped cylinders 1 as possible to avoid flexure of the base and upper plates 37 and 39 during tightening of the bolts 43.

The honing head 35 is formed by a plurality of honing sticks 45 which are positioned as cylindrical elements of the honing head 35. The honing sticks 45 are covered with a very hard abrasive, such as diamond based abrasives. The honing head 35 is a component of a honing machine 46 which is preferably either programmable or mechanically set up to control the rotational speed of the head 35, its vertical speed and position or dwell, and the radially outward or centrifugal pressure which the honing sticks 45 exert against the inner surface 5 of the cylinders 1 during the honing process. The honing machine 47 may, for example, be a model number CV616 Cylinder Hone, as manufactured by Sunnen Products of St. Louis, Mo. Control of the honing pressure allows the honing head 35 to finish the inner surface 5 of a cylinder 1 without distorting the wall 3 thereof, which would result in an irregular shape to the inner surface 5. Control of the honing pressure along with the vertical speed and dwell of the honing head 35 allows the application of the helical crosshatch finish 9 on the inner surfaces 5 of the cylinders 1. Once the cylinders 1 have been honed, they can be protectively packaged and shipped to engine rebuilding facilities for subsequent remanufacturing of engine blocks 2 of an appropriate size or warehoused for order by such rebuilding facilities.

Figure 10:
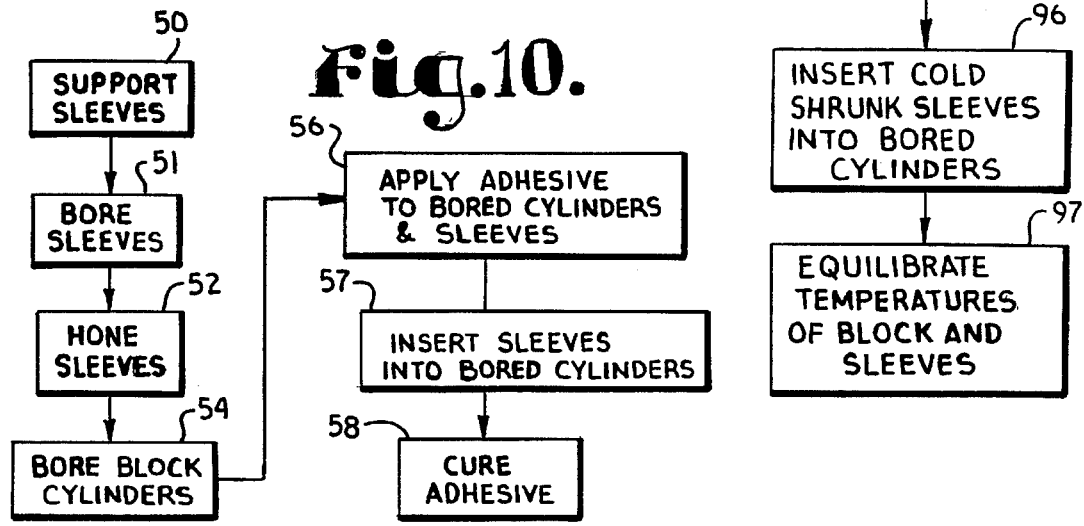
FIG. 10 is a block diagram illustrating the principal steps of a preferred process of the present invention for remanufacturing a cast iron engine block by adhesive installation of prefinished replacement cylinders.

FIG. 10 diagrammatically illustrates a preferred method or process 49 for remanufacturing a cast iron engine block using the prefinished cylinders 1 according to the present invention. At 50, the cylinders or sleeves 1 are supported, as by use of the boring fixture 15 or the honing fixture 30. At 51, the sleeves 1 are bored, as by the boring head 28 then honed at 52 to a prefinished condition. When an engine block 2 is to be remanufactured, the worn cylinders 53 (FIG. 7) are overbored at 54 to receive the sleeves 1 with a slight clearance between the outer cylindrical surface 4 of the sleeves 1 and a cylindrical surface 55 of the block cylinders 55. The diameter of the overbored block cylinders 53 may exceed the outer diameter of the sleeves 1 by an amount on the order of one to two thousandths of an inch (0.025 to 0.05 millimeters).

In order to minimize distortion of the engine block 2 during the boring step 54 and thereby increase the accuracy of the boring step 54, a torque plate (not shown) can be bolted to the block 2. Such a torque plate may be formed of iron, steel, or even aluminum and has apertures which are slightly larger than the final diameter of the overbored block cylinders 53. The torque plate also has bolt holes which align with the cylinder head bolt holes (not shown) of the block 2. The torque plate is simply bolted onto the block 2 in place of the cylinder head (not shown).

At 56, an adhesive is applied to the inner surface 55 of the block cylinders 53 and the outer surface 4 of the sleeves 1. The adhesive is preferably an anaerobically curing adhesive which will not breakdown at the operating temperatures of the engine employing the engine block 2 and which will not interfere with the transfer of heat from the sleeve 1 to the block 2 during operation. There are types of acrylic adhesives which are known in the automotive industry which are appropriate for use in the engine remanufacturing method 49 of the present invention. The sleeves 1 with adhesive applied and then inserted into the block cylinders 35 at 57 and the adhesive is allowed to cure at 58. The clearance of the overbored cylinders 35 relative to the sleeves 1 facilitates insertion of the sleeves 1 such that little if any force is required for the insertion step. The result is that the sleeves 1 are not distorted by the insertion step 57 nor by slight diametric irregularities of the overbored block cylinders 53. Thus, fairly average sized engine rebuilding shops can rebuild engine blocks 2 with a high degree of accuracy and economy using the prefinished replacement cylinders or sleeves 1 in the method 49 of the present invention.

Figure 8:
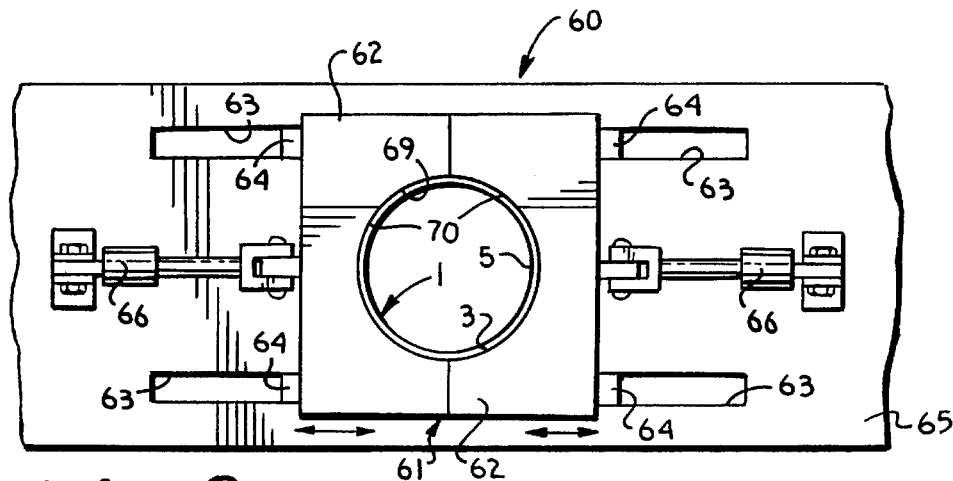
FIG. 8 is a top plan view of a clam shell embodiment of fixture for supporting the replacement cylinders during machining thereof along with linear motors for opening and closing cylinder support block halves.

FIG. 8 illustrates an alternative fixture 60 for use in fixing the position of a replacement cylinder 1 during boring and honing thereof. The fixture 60 is referred to as a clam shell or separating block type of fixture. The fixture 60 includes a support block 61 which is formed in block halves 62. Each block half 62 is slidably mounted in guide slots or tracks 63, as by guide followers 64, the slots 63 being formed in a support plate 65. Each block half 62 has a respective linear motor 66 connected between it and the support plate 65 to enable opposed movement of the block halves 62 toward and away from one another.

A cylindrical recess 69 is bored through the block halves 62 at the parting interface therebetween. Each block half 62 has a semi-cylindrical surface 70 of the recess 69 which has a radius sized to closely engage the outer cylindrical surface 4 of a cylinder 1 to thereby radially support the wall 3 of the cylinder 1. Such support prevents radial distortion of the cylinder wall 3 during machining of the inner surface 5. The block halves 62 are separated to receive a cylinder 1 in the recess 69 and closed to clamp the block halves 69 about the cylinder 1. The clamping force of the block halves 62 fixes the position of the cylinder 1 during rotary machining operations thereon. The fixture 60 may be used to support a cylinder 1 during both boring and honing of the inner surface 5 thereof, or separate fixtures 60 may be provided for the boring and honing operations.

Figure 9:
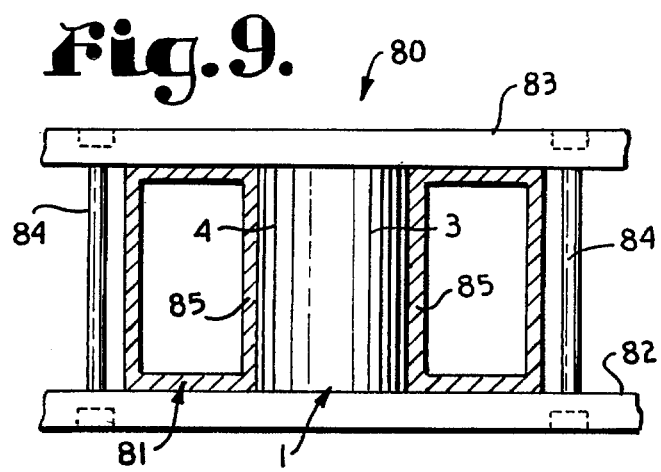
FIG. 9 is a side elevational view of a replacement cylinder support fixture incorporating an annular pneumatic bladder for supporting the walls of a replacement cylinder during machining operations thereon.

FIG. 9 illustrates a modified fixture 80, such as a honing fixture, which incorporates an annular bladder 81 to radially support the wall 3 of a replacement cylinder 1 during machining of the inner surface 5 thereof. The fixture 80 includes a base plate 82 and a top plate 83 which are substantially similar to the base plate 37 and upper plate 39 of the honing fixture 30. The plates 82 and 83 clamp a cylinder 1 therebetween by the use of clamping bolts 84 which extend through the upper plate 83 and are threaded into the base plate 82.

The bladder 81 is positioned between the plates 82 and 83 and is formed of a somewhat flexible material such as a rubber, plastic, or the like. An inner wall 85 of the bladder 81 is positioned to surround the cylinder 1. When inflated, as by a gas such as air or a liquid, the inner wall 85 compressively engages the wall 3 of the cylinder 1 whereby the pressure within the bladder 81 resists radial deformation of the cylinder 1 to result in more accurate machining. The modified fixture 80 is more appropriately used for the honing of the cylinder 1 since the honing operation requires much higher precision than the boring operation. When the bladder 81 is deflated, the inner wall 85 loosens from engagement with the cylinder 1 whereby the finished cylinder 1 can be removed from the fixture 80 and another prebored cylinder 1 inserted for honing.

Figure 11:
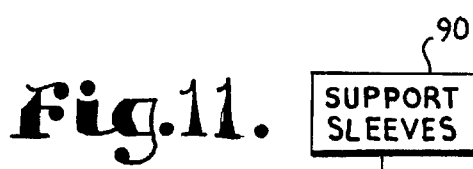
FIG. 11 is a block diagram illustrating the principal steps of an alternative process of the present invention for remanufacturing a cast iron engine block by cold shrinking the prefinished replacement cylinders prior to insertion.

FIG. 11 diagrammatically illustrates an alternative method or process 89 for remanufacturing a cast iron engine block using the prefinished cylinders 1 according to the present invention. At 90, the cylinders or sleeves 1 are supported, as by use of the boring fixture 15 or the honing fixture 30. At 91, the sleeves 1 are bored, as by the boring head 28 then honed at 92 to a prefinished condition. When an engine block 2 is to be remanufactured, the worn cylinders 53 are overbored at 94 for an interference fit with the sleeves 1. At 95, the prefinished sleeves or cylinders 1 are cold shrunk to reduce the outer diameter thereof to facilitate insertion at 96 of the cold shrunk sleeves 1 into the overbored cylinders 53. Thereafter, the temperatures of the block 2 and sleeves 1 are equilibrated at 97 whereby the sleeves 1 are frictionally retained in the overbored cylinders 53 of the engine block 2. The remanufactured block 2 may then be assembled with other engine components, such as pistons 98 with piston rings 10.

The sleeves or replacement cylinders 1 are cold shrunk to a temperature which will contract their outer diameters to less than the diameter of the overbored cylinders 53. A temperature in a range of about 0° F. to about −50° F. (about −18° C. to about −46° C.) is appropriate for the required contraction. Such temperatures are below that which can be achieved by the more common refrigeration processes, whereby somewhat specialized refrigeration equipment or mildly cryogenic liquids might be required. It is important that the cylinders 1 are cooled and reheated as evenly as possible to avoid introducing stresses which might fatigue the metal from which the cylinders 1 are formed. In particular, handling of the cold shrunk cylinders 1 for insertion in the engine block 2 should be done with similarly cooled handling tools (not shown). It is also important that the block cylinders 53 be bored at 94 with a high degree of accuracy since any irregularities of the overbored block cylinders 53 will be transferred to the replacement sleeves 1 when temperature equalibration causes the sleeves 1 to expand into frictional contact with the block cylinders 53.

It is to be understood that while certain forms of the present invention have been illustrated and described herein, it is not to be limited to the specific forms or arrangement of parts described and shown.

What is claimed and desired to be secured by Letters Patent is as follows:

1. A prefinished replacement cylinder for cylinder relining of an internal combustion engine block not originally designed for relining and having a bore sized to a selected diameter, said block having been configured by an original manufacturer to receive a piston of a selected OEM standard diameter within said bore prior to resizing, said replacement cylinder comprising:

(a) a flangeless cylindrical sleeve having a wall and an outer cylindrical surface sized to enable a fit of a selected tightness within a said bore of said engine block which has been sized to said selected diameter, said wall having a wall thickness which is substantially less than a thickness which would enable said sleeve to withstand engine combustion pressure without external support;

(b) said sleeve having an inner cylindrical surface with a diameter to enable reception therein of a piston of said OEM standard diameter for said block; and (c) said inner cylindrical surface being prefinished.

2. A cylinder as set forth in claim 1 wherein:

(a) said sleeve is formed of a cast iron.

3. A cylinder as set forth in claim 1 wherein:

(a) said inner cylindrical surface is prefinished with a helical crosshatch pattern.

4. An engine cylinder block assembly comprising:

(a) a cast iron engine cylinder block having a bore of a selected diameter formed therein, said bore being defined by a substantially continuous block cylindrical surface;

(b) a flangeless dry liner cylinder sleeve formed of cast iron and having a selected length and a selected outer diameter which is slightly less than said selected bore diameter, said sleeve being formed by a cylindrical wall having a wall thickness between an inner sleeve cylindrical surface and an outer sleeve cylindrical surface, said wall thickness being substantially less than a thickness which would enable said sleeve to withstand engine combustion pressure without external support; and (c) said cylinder sleeve being positioned and adhesively retained within said block bore by an adhesive applied to substantially the entirety of said block cylindrical surface and said outer sleeve cylindrical surface.

5. A cylinder as set forth in claim 4 wherein:

(c) said inner sleeve cylindrical surface is prefinished.

6. A cylinder as set forth in claim 4 wherein:

(a) said inner sleeve cylindrical surface is prefinished with a helical crosshatch pattern.

7. A cast iron replacement cylinder for remanufacture of an internal combustion engine block, said engine block including a plurality of bores which have been sized to a selected bore diameter in excess of an OEM cylinder diameter, said OEM cylinder diameter being sized to accept OEM pistons of a predetermined piston diameter and said replacement cylinder comprising:

(a) a flangeless cylindrical sleeve having a wall thickness and an outer cylindrical surface which is substantially uniform in diameter along the entire length of said sleeve, said uniform outer diameter being slightly less than said selected bore diameter, said wall thickness being substantially less than a thickness which would enable said sleeve to withstand engine combustion pressure without external support; and (b) said flangeless cylindrical sleeve has an inner cylindrical surface with a diameter sized to receive one of said OEM pistons.

8. A cylinder as set forth in claim 7 wherein:

(c) said inner cylindrical surface is prefinished.

9. A cylinder as set forth in claim 7 wherein:

(a) said inner cylindrical surface is prefinished with a helical crosshatch pattern.

10. A remanufactured engine cylinder block assembly comprising:

(a) an engine cylinder block with a plurality of bores sized to a selected diameter in excess of an OEM cylinder diameter for each bore in said block, each said bore being defined by a substantially continuous internal block cylindrical surface;

(b) a plurality of flangeless cylinder sleeves formed of cast iron and having a selected length and a selected outer diameter which is slightly less than said selected bore diameter, each said sleeve being formed by a cylindrical wall having a wall thickness between an inner cylindrical surface and an outer cylindrical surface, said wall thickness being substantially less than a thickness which would enable said sleeve to withstand engine combustion pressure without external support; and (c) an adhesive substantially coating said outer cylindrical surface of each said cylinder sleeve and said internal block cylindrical surface of each said cylinder block, each said cylinder sleeve being positioned within and adhesively retained within a respective one of said block cylinders by said adhesive.

11. A cylinder as set forth in claim 10 wherein:

(c) said inner cylindrical surface is prefinished.

12. A cylinder as set forth in claim 10 wherein:

(a) said inner cylindrical surface is prefinished with a helical crosshatch pattern.

* * * * *